United States Patent
Jackson

(10) Patent No.: US 6,516,748 B1
(45) Date of Patent: Feb. 11, 2003

(54) COMBINATION PET COLLAR AND WATER BOWL

(76) Inventor: Heather Jackson, 444 E. 85th St., Apt. C, New York, NY (US) 10028

( * ) Notice: Subject to any disclaimer, the term of this patent is extended or adjusted under 35 U.S.C. 154(b) by 111 days.

(21) Appl. No.: 08/872,004

(22) Filed: Jun. 9, 1997

(51) Int. Cl.[7] .......................... A01K 7/00; A01K 27/00
(52) U.S. Cl. ........................................ 119/72; 119/858
(58) Field of Search ........................... 119/72, 855, 856, 119/858, 860; 224/148.7; 215/900

(56) References Cited

U.S. PATENT DOCUMENTS

| | | | |
|---|---|---|---|
| 2,551,673 A | | 5/1951 | Hasselquist |
| 3,842,806 A | * | 10/1974 | McBride et al. ............. 119/855 |
| 4,090,650 A | * | 5/1978 | Gotta ................... 224/148.7 X |
| 4,768,688 A | * | 9/1988 | Harrigan ............... 224/148.7 X |
| 5,184,762 A | | 2/1993 | Nevitt ......................... 224/148 |
| 5,363,809 A | | 11/1994 | Roe ............................ 119/792 |
| 5,467,743 A | | 11/1995 | Doose ........................ 119/864 |
| 5,560,321 A | | 10/1996 | Hess ........................... 119/858 |

* cited by examiner

Primary Examiner—Robert P. Swiatek
(74) Attorney, Agent, or Firm—Coats & Bennett, P.L.L.C.

(57) ABSTRACT

A pet collar includes a fluid compartment for containing clean drinking water for the pet, and a storage compartment for containing a collapsible or foldable water bow. The collar can be filled with water and fastened around the animal's neck. When the animal is thirsty, the water bowl can be removed from the storage compartment. The collar fits into the water bowl and supports the sidewalls of the water bowl. The water can then be let out from the fluid compartment to fill the water bowl.

10 Claims, 7 Drawing Sheets

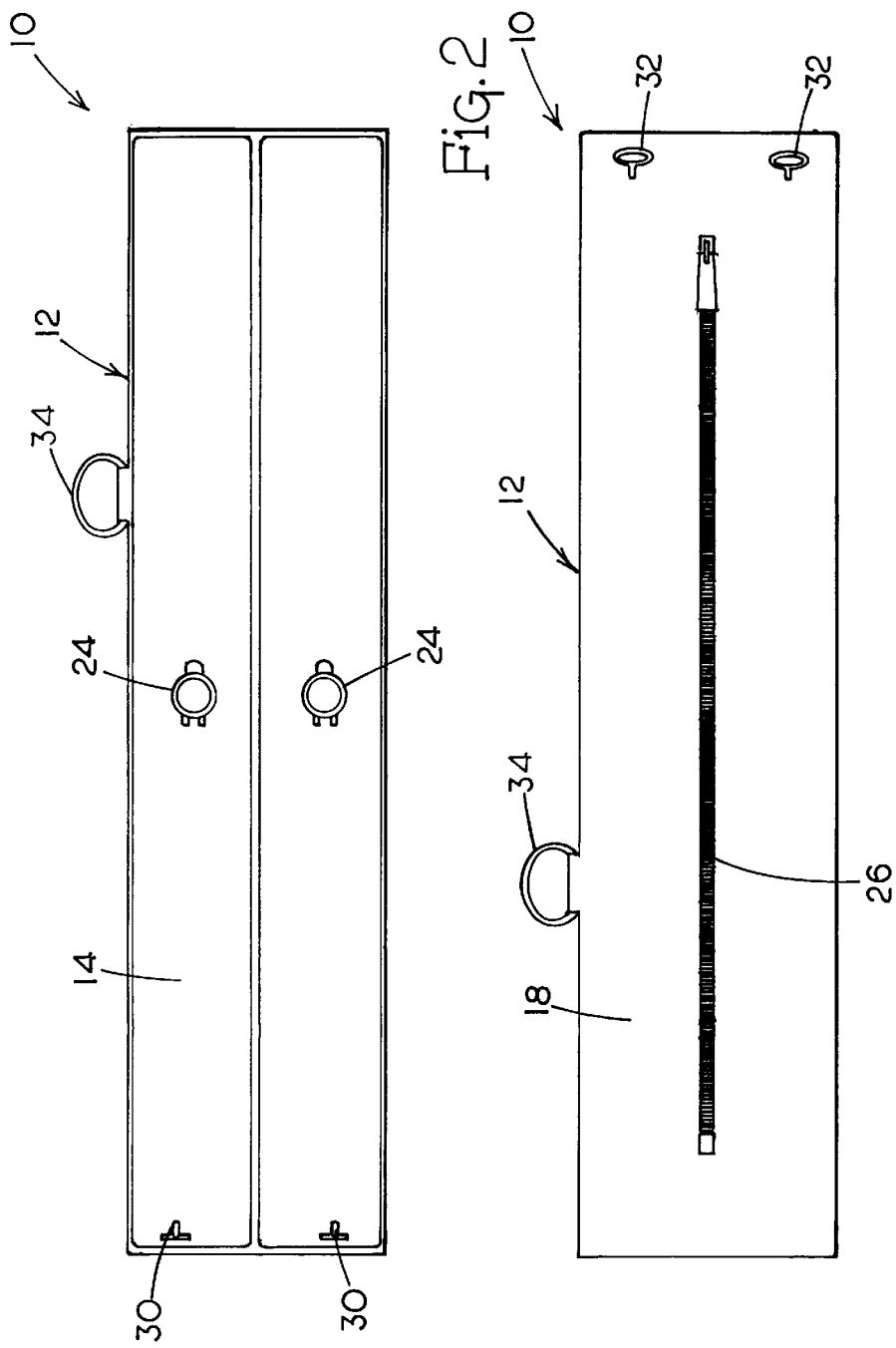

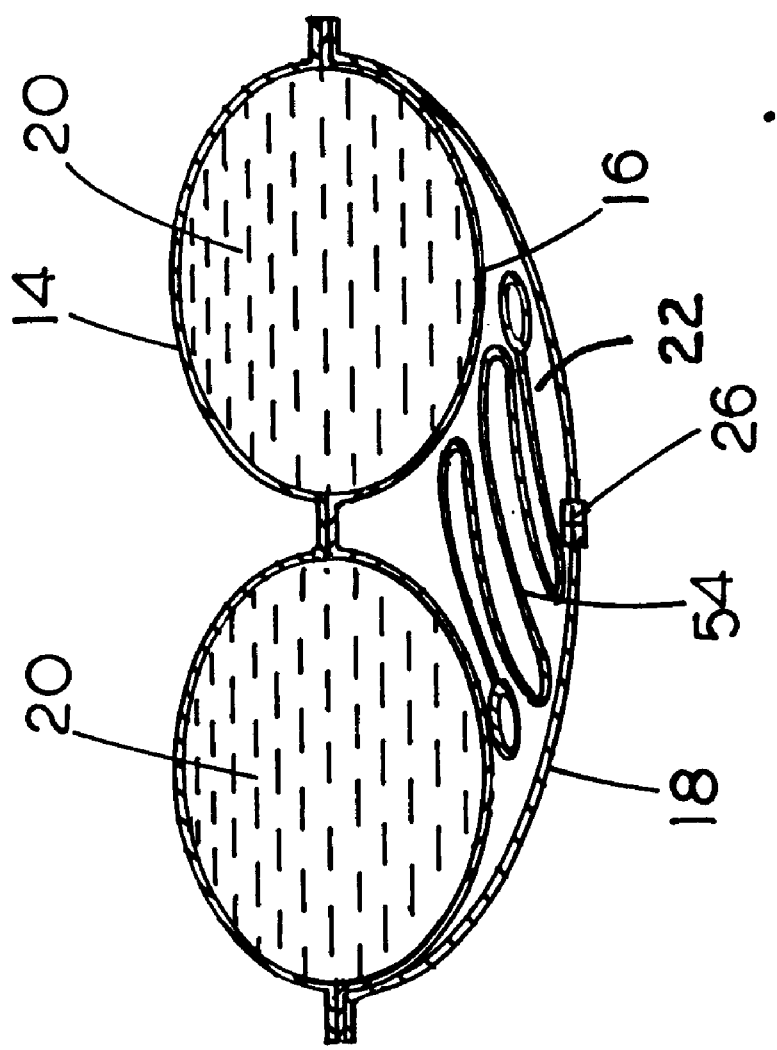

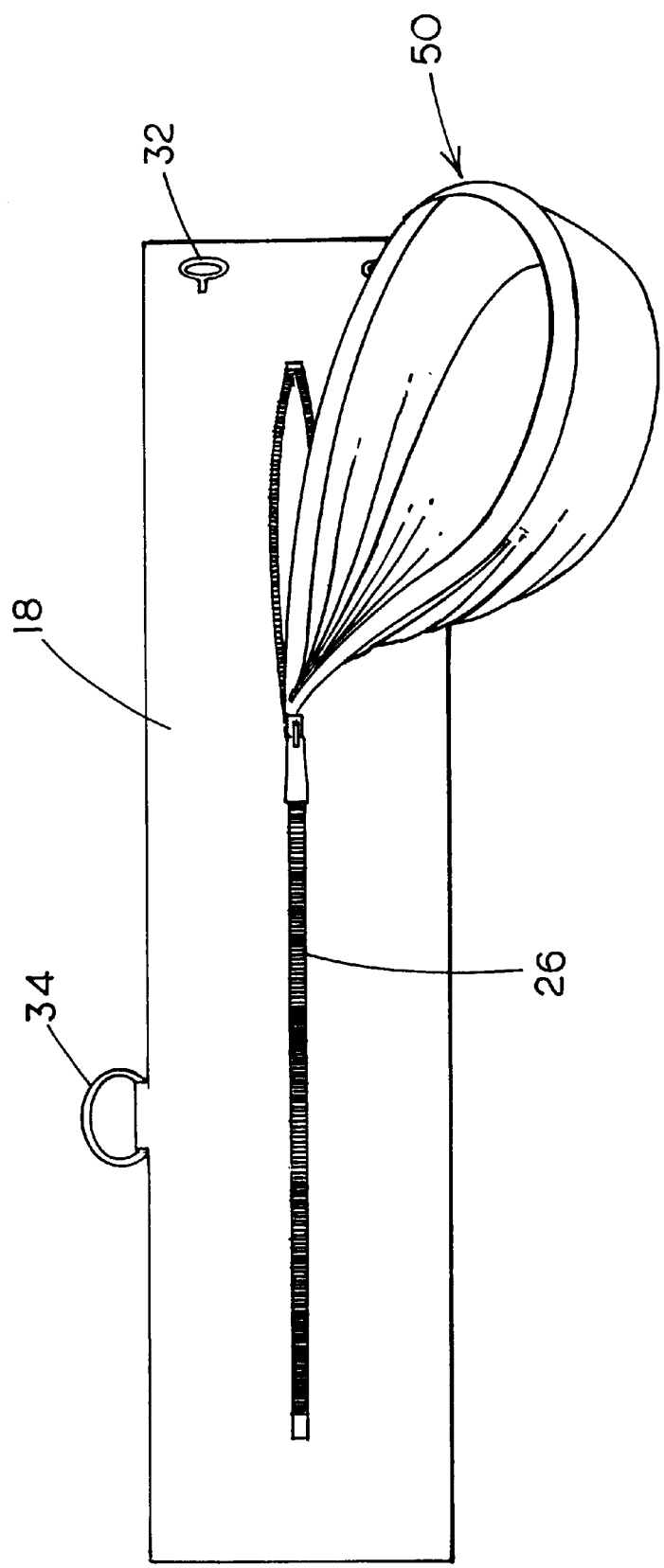

US 6,516,748 B1

COMBINATION PET COLLAR AND WATER BOWL

FIELD OF THE INVENTION

The present invention relates generally to pet collars, and more particularly, to a pet collar which is specifically designed to hold drinking water for use by the pet.

BACKGROUND OF THE INVENTION

It is believed that dogs were the first animal to be domesticated by man. Dogs have many useful purposes. For instance, dogs have been and continue to be used for hunting, herding, guiding, and guarding. However, most dogs today serve primarily as companions or as pets. Consequently, dogs are frequently referred to as "man's best friend."

It is common for dogs to accompany their owners while engaging in such activities as walking, biking or jogging. Dogs offer both companionship and protection during these activities. In warm seasons, the dog may become thirsty while accompanying their owner. Depending upon the location, there may not be a readily available source of clean drinking water for the dog. Even if a source of water were available (such as a water fountain in a park), there may not be a suitable container present to put drinking water in for the dog. In the past, harnesses have been devised to allow animals to carry food and/or beverages. For example, U.S. Pat. No. 5,184,762 to Nevitt shows a harness for a dog which is capable of holding several containers. However, such harnesses tend to be cumbersome and awkward to use. For this and other reasons, dog harnesses have not been used to any significant extent.

Accordingly, there continues to be a need for a device which allows dogs to carry their own drinking water and which provides a suitable container from which the dog can drink.

SUMMARY OF THE INVENTION

The present invention solves some of the aforementioned problems by providing a pet collar which is specifically designed to hold drinking water for the animal. The collar comprises a tubular band made of a waterproof material which is sealed at each end. The tubular band includes one or more fluid compartments which can be filled with drinking water for the animal. The band includes suitable fasteners at each end to secure the band around the pet's neck.

In another aspect of the present invention, the tubular band includes a storage compartment in which a flexible bowl is stored. The flexible bowl is made preferably from a sheet-like material which can be folded and placed in the storage compartment. The bowl includes a bottom and a sidewall. When the pet is thirsty, the bowl is removed from the storage compartment and unfolded. The collar is removed from the animal's neck and inserted into the bowl to provide support for the sidewalls of the bowl. The water contained in the collar can then be emptied into the bowl for the animal to drink.

The present invention not only provides a source of clean drinking water for the pet, but also provides a suitable container from which the pet can drink. Since the pet carries its own water, its owner is not burdened. Moreover, the collar is more convenient to use than harnesses which have been devised in the past. Furthermore, dogs and other pets are already accustomed to wearing a collar.

Other objects and advantages of the present invention will become apparent and obvious from a study of the following description and the accompanying drawings which are merely illustrative of such invention.

BRIEF DESCRIPTION OF THE DRAWINGS

FIG. 2 is a plan view showing the inside of the pet collar.

FIG. 3 is a plan view showing the outside of the pet collar.

FIG. 4 is a section view of the collar.

FIG. 5 is a perspective view showing the flexible bowl being removed from the storage compartment in the pet collar.

DETAILED DESCRIPTION OF THE INVENTION

Figure 1:
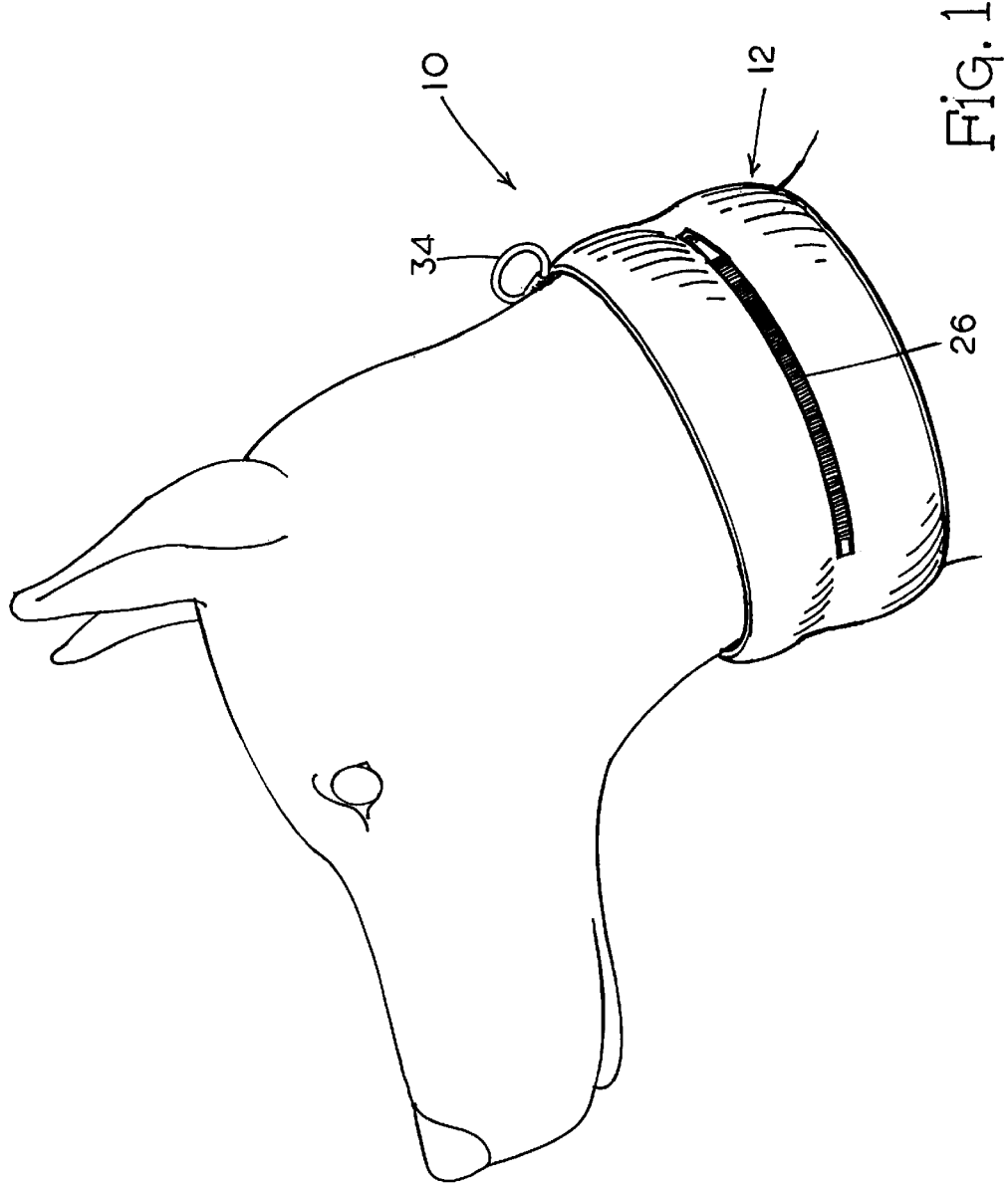
FIG. 1 is a perspective view of the pet collar of the present invention secured about the neck of a dog.

Referring now to the drawings, the combination pet collar 10 and water bowl 50 is shown. The collar 10 comprises a tubular band 12 made of a waterproof material. The tubular band 12 includes one or more fluid compartments 20 which can be filled with drinking water for the animal, and a storage compartment for the water bowl 50. The water bowl 50 is made of a flexible sheet material which can be folded and placed inside the storage compartment of the collar 10 when not in use.

FIGS. 2–4 illustrate the collar 10 in more detail. The collar 10 comprises a band 12 made of a waterproof, sheet material such as a thermoplastic. The band 12 is constructed in three plies an inner ply 14, a middle ply 16, and an outer ply 18. The inner ply 14 and middle ply 16 are heat sealed along the outer perimeter of the plies to form at least one fluid compartment. In the preferred embodiment, the inner ply 14 and middle ply 16 are also sealed along a center line of the band 12 to form two separate fluid compartments 14. The outer ply 18 is sealed along the outer perimeter thereof to the middle ply 16 to define a storage compartment 22 between the middle ply 16 and the outer ply 18.

As shown in FIG. 2, the inner ply includes a pair of fluid ports 24, one for each fluid compartment 14. The fluid ports 24 comprise a fitting with a removable cap and provide a means to put water into and discharge water from the fluid compartments 14.

The outer ply 18 includes a zipper 26 which provides access to the storage compartment 22. Of course, it will be readily appreciated that other types of closures could also be use such as snaps, buttons, VELCRO-type fasteners, etc. The specific type of closure selected is not a material part of the invention.

In order to secure the collar 10 around the neck of an animal, a fastening means is provided for fastening the ends of the collar 10 together. In the preferred embodiment described herein, the fastening means comprises a pair of hooks 30 at one end of the collar which engage with loops 32 at the opposite end of the collar 10. In the embodiment shown, the hooks 30 are disposed on the inner ply 14 while the loops 32 are attached to the outer ply 18. Again, while hooks 30 and loops 32 are shown in the described embodiment, there are many other types of suitable fasteners which could be used including buckles and straps, snaps, and VELCRO-type fasteners. The choice of fastening means, again, is not a material aspect of the invention.

The collar 10 also includes a leash connector 34 for attaching a leash to the collar 10. In the embodiment shaown, the leash connector 34 comprises a metal loop attached along an upper edge of the collar 10.

Figure 7:
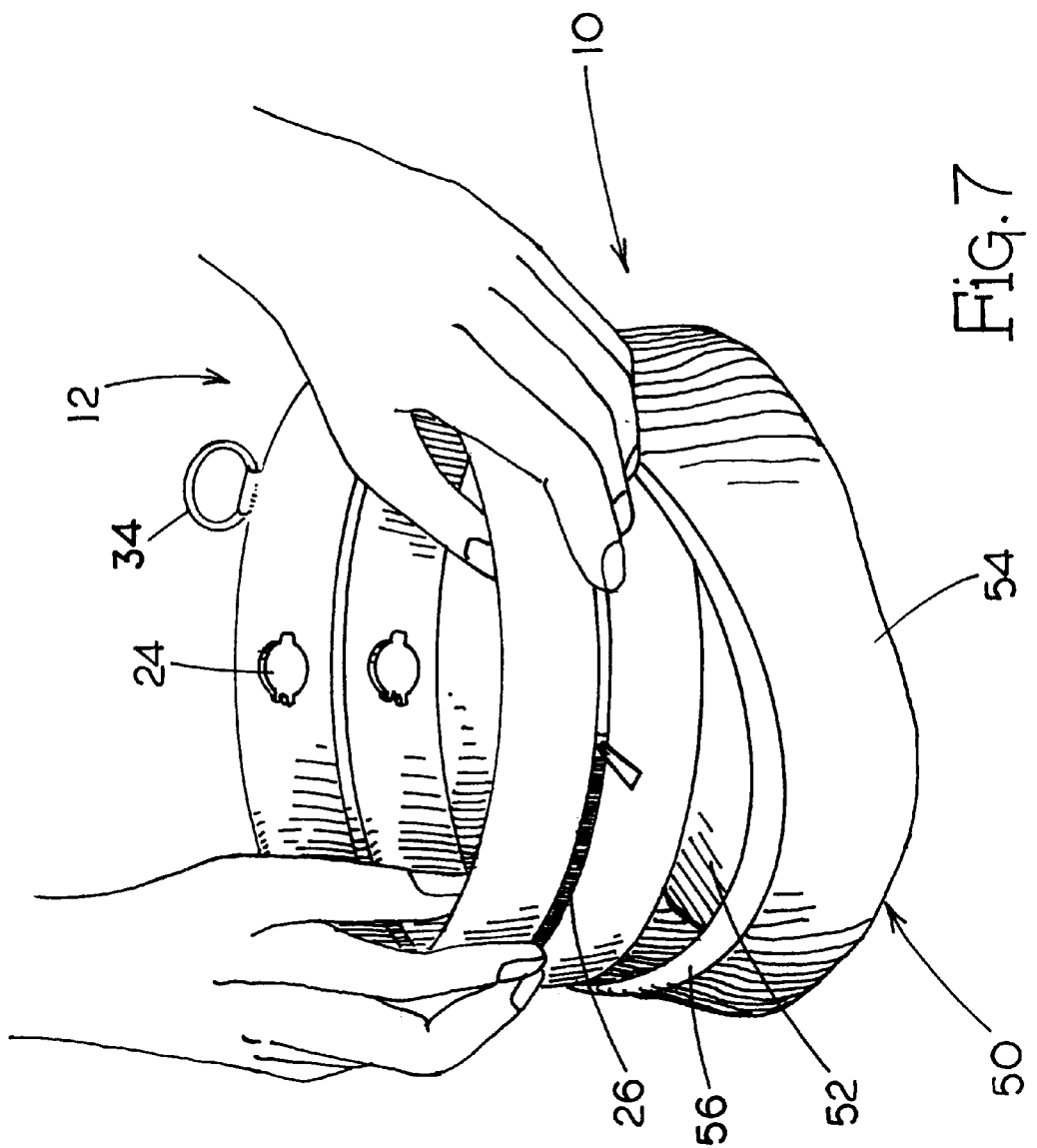
FIG. 7 is a perspective view showing the pet collar being inserted into the flexible bowl to support the sidewalls of the bowl.
Figure 8:
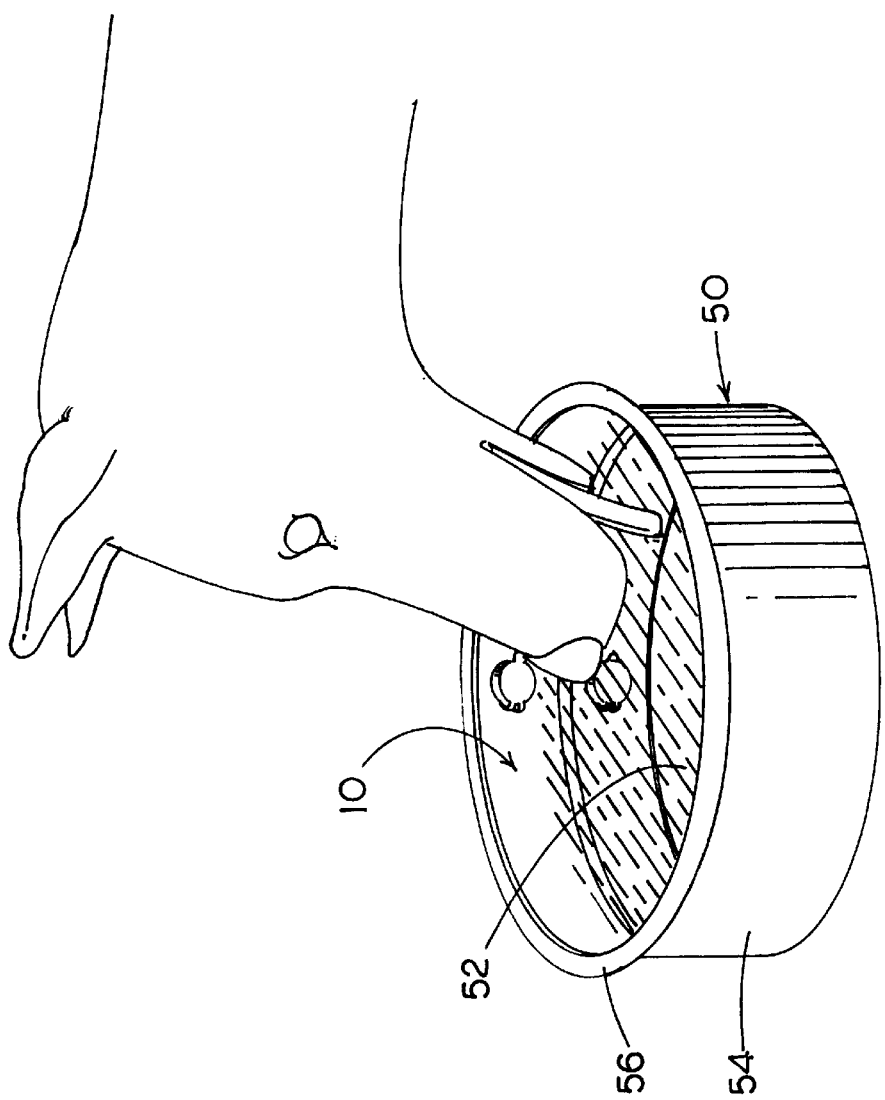
FIG. 8 is a perspective view showing the water bowl in use.

The water bowl 50, which is shown best in FIGS. 7 and 8, is made of a waterproof sheet material which is sufficiently pliable to be folded up and placed in the storage compartment of the collar 10 as shown in FIG. 4. The water bowl 50 includes a bottom 52, a sidewall 54 that extends upwardly from the bottom 52, and a rim 56. The sidewall 54 of the water bowl 50 is not self-supporting. Support for the sidewall 54 is provided by the collar 10 as will be described below.

The pet collar 10 and water bowl 50 may be used when the dog accompanies its owner while jogging, hiking, walking, or biking. Each fluid compartment 20 is filled with clean drinking water for the pet. For example, each fluid compartment 20 can be filled with clean water from a household faucet. The water bowl 50 is folded and inserted into the storage compartment. The collar 10 is then fastened around the neck of the animal by engaging the hooks 30 at one end of the collar 10 with the loops 32 at the opposite end.

Figure 6:
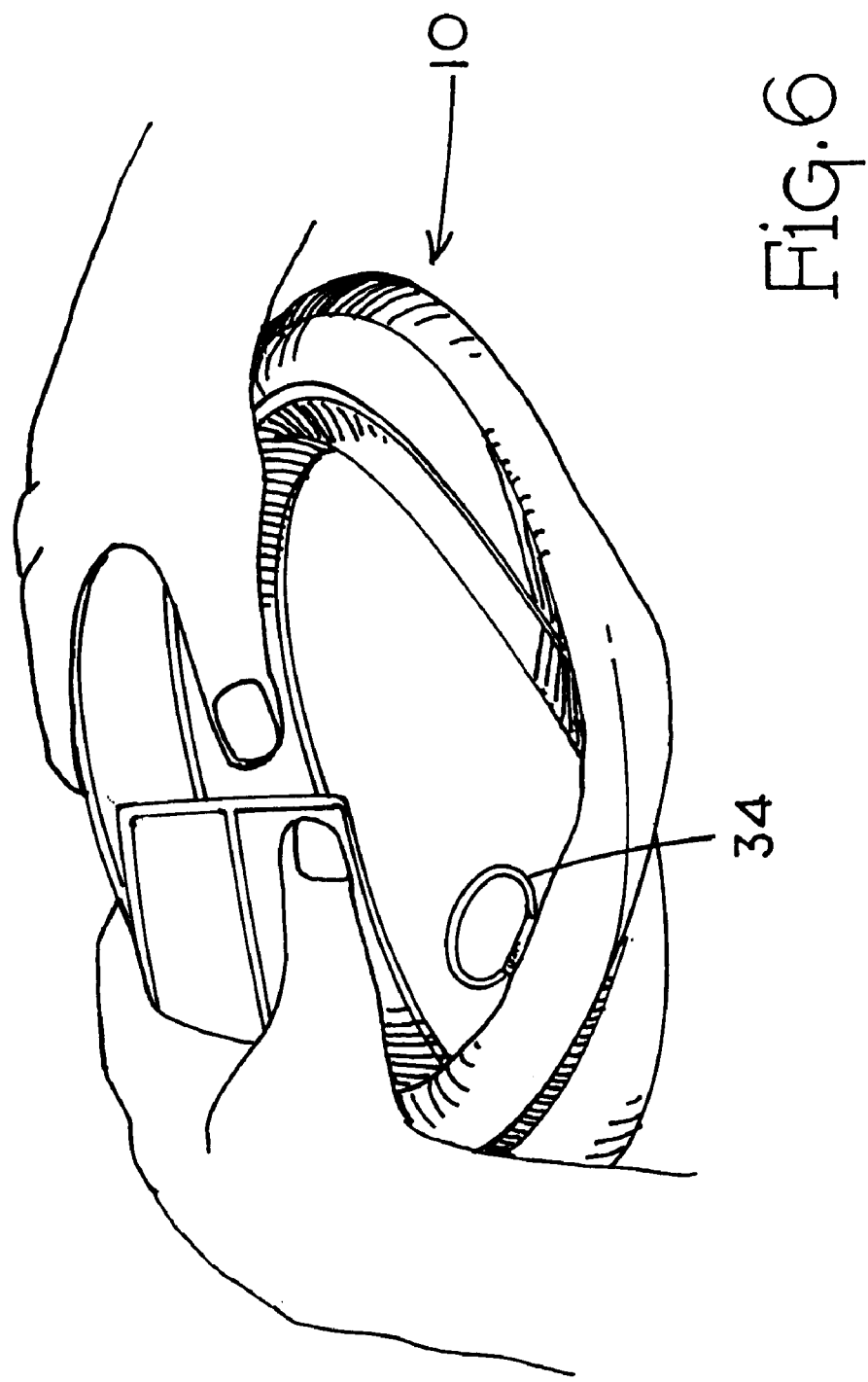
FIG. 6 is a perspective view showing how the ends of the pet collar are joined.

When the pet becomes thirsty, the water bowl 50 can be removed from the zippered storage compartment as shown in FIG. 5. The collar 10 is removed from the pet's neck an the ends are fastened together as shown in FIG. 6. The collar 10 is then inserted into the water bowl 50 as shown in FIG. 7 so that the collar 10 can support the sidewalls 54 of the water bowl 50. The water ports 24 can then be opened to let water into the water bowl 50 to allow the animal to drink as shown in FIG. 8.

Based on the foregoing, it is apparent that the collar 10 and water bowl 50 can provide a source of drinking water for an animal when no other water source is available.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A combination pet collar and water bowl comprising:

a) a tubular band made of a waterproof material which defines at least one fluid compartment;

b) at least one fluid port in said tubular band for introducing a fluid into said fluid compartment or for discharging fluid from said fluid compartment;

c) a fastener for securing opposing ends of said tubular band together; and d) a flexible bowl including a bottom and a sidewall made of a sheet-like material, wherein said tubular band is insertable into said bowl to provide support for the sidewall of the bowl.

2. The pet collar according to claim 1 wherein said fastener is a hook-type fastener.

3. The pet collar according to claim 1 including at least two separate fluid compartments, each said compartment having a separate fluid port.

4. The pet collar according to claim 1 further including a storage compartment in said tubular band for storing a non-fluid article.

5. The combination pet collar and water bowl of claim 4 wherein said flexible bowl is stored in said storage compartment when not in use.

6. A combination pet collar and water bowl comprising:

a) a band having opposing ends;

b) a fastener for securing the opposing ends of said band together; and c) a flexible bowl including a bottom and a sidewall made of a sheet-like material, wherein said tubular band is insertable into said bowl to provide support for the sidewall of the bowl.

7. The pet collar according to claim 6 wherein said fastener is a hook-type fastener.

8. The pet collar according to claim 6 including at least two separate fluid compartments, each said compartment having a separate fluid port.

9. The pet collar according to claim 6 further including a storage compartment in said band for storing a non-fluid article.

10. The combination pet collar and water bowl of claim 9 wherein said flexible bowl is stored in said storage compartment when not in use.

* * * * *